United States Patent [19]

Papalos et al.

[11] 4,256,871
[45] Mar. 17, 1981

[54] SYNTHETIC POLYMER EMULSIFIER FROM CONDENSATION OF NAPHTHALENE SULFONIC ACID, ALKYL BENZENE SULFONIC ACID AND FORMALDEHYDE

[75] Inventors: John G. Papalos, Ledgewood; Ronald W. Kavchok, Belle Mead, both of N.J.

[73] Assignee: Diamond Shamrock Corporation, Dallas, Tex.

[21] Appl. No.: 31,113

[22] Filed: Apr. 18, 1979

[51] Int. Cl.$^3$ ............................................... C08G 16/02
[52] U.S. Cl. .......................... 528/265; 260/29.6 MQ; 260/29.6 NR; 260/29.7 NR; 260/29.7 SQ; 260/505 R
[58] Field of Search ..................... 528/265; 260/505 R

[56] References Cited
U.S. PATENT DOCUMENTS 2,141,569  12/1938  Tucker et al. ..................... 106/27
2,604,467  7/1952  Crouch et al. ............. 260/29.6 MQ
3,277,162  10/1966  Johnson ......................... 260/505 R Primary Examiner—Harold D. Anderson
Attorney, Agent, or Firm—Leslie G. Nunn, Jr.

[57] ABSTRACT

A condensation product of naphthalenesulfonic acid and linear alkyl benzenesulfonic acid having an alkyl moiety of from about 4 to about 20 carbon atoms with formaldehyde or salt thereof is useful as a secondary emulsifier and co-emulsifier in synthetic polymer latex processes. From about 0.05 to about 5 parts by weight of the condensation product per 100 parts by weight of latex monomer is used as a secondary emulsifier and from about 0.5 to about 5 parts by weight of the condensation product per 100 parts by weight of latex monomer is used as a co-emulsifier. Additionally, products can be prepared which have been found to be biodegradable. Use of these condensation products eliminates pollution caused by a secondary emulsifier or co-emulsifier in polymer manufacture effluent.

9 Claims, No Drawings

SYNTHETIC POLYMER EMULSIFIER FROM CONDENSATION OF NAPHTHALENE SULFONIC ACID, ALKYL BENZENE SULFONIC ACID AND FORMALDEHYDE

BACKGROUND OF THE INVENTION

1. Field of the Invention

This invention relates to a secondary emulsifier and co-emulsifier for a synthetic polymer process.

2. Description of the Prior Art

Salts of condensation products of formaldehyde and naphthalenesulfonic acid have been used as a secondary emulsifier and as a co-emulsifier in the preparation of synthetic polymer latex via free radically initiated emulsion polymerization. Use of a secondary emulsifier in an emulsion polymerization system greatly enhances the stability of the latex during synthesis, i.e., eliminates or minimizes the formation of precoagulum during the reaction. A co-emulsifier such as a nonionic surfactant is used to stabilize the latex.

Formaldehyde condensed naphthalene sulfonates of the Lomar®, Tamol®, Daxad® and Darvan-®—types have been used in emulsion polymerization as secondary emulsifiers since the adoption of GR-S recipes during World War II. Because of the uniqueness of this class of chemical compounds, no substitutes have been discovered for the past thirty years.

The primary function of a secondary emulsifier is to permit addition of electrolyte to a polymerization recipe without subsequent instability during reaction. Without a secondary emulsifier, a typical emulsion polymerization recipe, containing added electrolyte, produces an unstable latex.

As the conversion from monomer to polymer increases, destabilization, as evidenced by precoagulum formation, occurs without the aid of a secondary emulsifier. Elimination of electrolyte from the recipe results in unacceptable viscosity increases during the reaction. An electrolyte is necessary to maintain fluidity during the polymerization reaction. A secondary emulsifier is required to offset the deleterious side affects of the electrolyte.

The term secondary emulsifier is a misnomer as the formaldehyde-condensed naphthalene sulfonates are not emulsifiers according to the definition of the term. For example, Lomar® PW has no affect on lowering surface tension and would, therefore, have no definable (infinite) critical micelle concentration (C.M.C.). A formaldehyde-condensed naphthalene sulfonate is neither an emulsifier nor a surfactant. It behaves more like an in-situ protective colloid during polymerization. By not having surfactant characteristics, this sulfonate has no effect on particle size and particle formation during polymerization. This is why formaldehyde-condensed naphthalene sulfonates are unique. They are the only class of compounds that enhance latex stability without affecting particle size during emulsion polymerization. Formaldehyde-condensed naphthalene sulfonates are excellent products for this application.

A major drawback of formaldehyde-condensed naphthalene sulfonates has recently been emphasized. These sulfonates are not biodegradable. Major rubber companies, which use these sulfonates in polymerization, have been cited by the Environmental Protection Agency (EPA) for pollution of major waterways throughout the United States, primarily in the Gulf states. Formaldehyde-condensed naphthalene sulfonates are extremely difficult to precipitate from aqueous solutions as all common alkali salts as well as the free acid form are soluble in water. During rubber coagulation, whether by salt-acid, aluminum, calcium or magnesium salts, formaldehyde-condensed naphthalene sulfonates remain soluble in water and do not coprecipitate with the polymer. They, therefore, evolve as plant effluent into settling ponds. Water treating techniques are fruitless. Flocculents cannot be economically employed to precipitate formaldehyde-condensed naphthalene sulfonates. Aeration or oxidation is ineffective as these sulfonates are not susceptible to biological degradation. Formaldehyde-condensed naphthalene sulfonates have been cited as a major contributing factor in pollution caused by polymer plant effluent. Because of this there is a definite need for an alternate product which is functionally equivalent to formaldehyde-condensed naphthalene sulfonates, but is either biodegradable or precipitatable.

SUMMARY OF THE INVENTION

A secondary emulsifier and co-emulsifier for use in synthetic polymer latex processes is prepared by condensation of naphthalenesulfonic acid (NSA) and linear alkylbenzenesulfonic acid (ABSA) with formaldehyde. This condensation product is prepared by reacting 1 mole of naphthalenesulfonic acid and from about 0.1 to about 5 moles of linear alkylbenzenesulfonic acid having an alkyl moiety of from about 4 to about 20 carbon atoms with from about 0.26 to about 3.1 moles of formaldehyde at about 70° C. to about 150° C. until all of the formaldehyde has reacted. If desired, the condensation product may be reacted with a salt forming cation to form a salt. When used as a secondary emulsifier from about 0.05 to about 5 parts by weight of the condensation product per 100 parts by weight of the latex monomer is added to the synthetic latex recipe. When used as a co-emulsifier from about 0.5 to about 5 parts by weight of the condensation product per 100 parts by weight of the latex monomer is added to the synthetic latex recipe. Use of the condensation product reduces secondary emulsifier or co-emulsifier pollution in polymer plant effluent.

DESCRIPTION OF THE PREFERRED EMBODIMENTS

A useful condensation product is prepared by reacting together at a temperature ranging from about 70° C. to about 150° C., about 1 mole of naphthalenesulfonic acid, from about 1 to about 1.5 moles of linear alkylbenzenesulfonic acid and from about 1.0 to about 1.5 moles of formaldehyde until all of the formaldehyde has reacted.

Naphthalenesulfonic acid for use in the condensation product may be prepared by reacting naphthalene with an excess of sulfuric acid. These reactants may be mixed at room temperature, heated to about 150° C. and reacted for about 3 hours at 150° C. to obtain a mixture of naphthalenesulfonic acid and sulfuric acid.

Alkylbenzenesulfonic acids useful in this invention are those having a linear alkyl moiety of from 4 to 20 carbon atoms. Alkyl moieties having 10 to 16 carbon atoms may be used with alkyl moieties having 10 to 16 carbon atoms being preferred. Although the most common alkyl groups are named "dodecyl" for convenience, they actually are blends of $C_{10-16}$ alkyls having an average of twelve carbon atoms. Branched chain alkyls are not useful in this invention because they are not sufficiently biodegradable.

The only substitutions desired on the benzene ring are one of the above linear alkyl moieties attached terminally and a sulfonic acid moiety. As a practical matter, some dialkylbenzene is produced in the benzene alkylation process, but presence of small amounts of this undesirable impurity does not affect the condensation product.

Linear alkylbenzenes are well known in the art. They may be prepared by a Friedel-Crafts reaction of benzene with kerosene-derived n-alkyl chlorides. Linear alkylbenzenes are commercially available as mixtures with varying alkyl chain lengths.

Sulfonation of linear alkylbenzenes is also well known in the art and may be accomplished with sulfonating agents such as sulfuric acid, sulfur trioxide and the like.

Formaldehyde may be used in this invention in the form of 10 to 40% aqueous solutions, 30 to 55% alcoholic solutions with alcohols such as methanol, n-butanol or the like. Formaldehyde liberating compositions such as paraformaldehyde, trioxane or the like may be used. These compositions may include any form such as an acetal which is capable of producing formaldehyde.

A condensation product of naphthalenesulfonic acid and linear alkylbenzenesulfonic acid with formaldehyde or a salt thereof may be used. Any salt forming cation having acceptable properties in the polymerization recipe may be reacted with the condensation product. Useful salt forming cations include the lithium, potassium, sodium and ammonium ions. Zinc, aluminum and magnesium salts of the condensation product also display surfactant properties but sodium and potassium salts are preferred. Amines such as methylamine, diethylamine, triethanolamine and the like may be reacted with the condensation products to obtain salts.

The condensation product is useful as a secondary emulsifier or as a co-emulsifier in the manufacture of synthetic latex in a recipe containing water, primary emulsifier (s), a free radical generating catalyst system, at least one monomer and a secondary emulsifier or co-emulsifier, with optionally, a chelating agent, an electrolyte, a pH buffer and a chain transfer agent. Addition of an effective amount of the condensation product as a secondary emulsifier or as a co-emulsifier reduces pollution in polymer plant effluent caused by the emulsifier. Since the condensation product is either biodegradable or precipitatable from the effluent, it is easily removed. During conventional salt-acid coagulation, the condensation product will remain soluble and evolve with the process effluent. It will subsequently be biologically degraded in settling ponds. The condensation product may also be coprecipitated with the polymer during latex coagulation with a coagulant system consisting of calcium nitrate or other water soluble calcium salts.

The secondary and co-emulsifiers of this invention may be evaluated in bottle polymerizations using a standard synthetic latex recipe. Amounts of ingredients shown in the recipe below are in phm, i.e., parts by weight based upon 100 parts by weight of the monomer used in the synthetic latex. Polymer monomers which may be used in the recipe include isoprene, chloroprene, acrylonitrile, butadiene, vinylchloride, styrene, acrylate such as acrylic acid, acrylic ester, methacrylic acid, methacrylic ester and the like. The recipe shown below is a polyisoprene recipe containing a secondary emulsifier:

| Ingredient | phm |
| --- | --- |
| water (total) | 200 |
| isoprene (monomer) | 100 |
| sodium stearate | 2.5 |
| potassium rosinate | 2.5 |
| trisodium phosphate | 0.3 |
| secondary emulsifier | 1.0 |
| Vazo 64 ® | 0.5 |

For a fuller understanding of the nature and advantages of this invention, reference may be made to the following examples. These examples are given merely to illustrate the invention and are not to be construed in a limiting sense. All quantities, proportions and percentages are by weight and all references to temperature are °C. unless otherwise indicated.

EXAMPLE I

This example demonstrates preparation of a condensation product of a linear dodecylbenzenesulfonic acid and naphthalenesulfonic acid with formaldehyde for use as a biodegradable secondary emulsifier or co-emulsifier within the scope of this invention.

(a) Preparation of linear dodecylbenzenesulfonic acid

A total of 69 g of linear dodecylbenzene was charged to a flask under a nitrogen atmosphere. Then 43.3 g of sulfuric acid (20% $SO_3$) was added to the dodecylbenzene slowly over a period of four hours while the reaction temperature was maintained at 20°–30° C. After the sulfuric acid addition was complete, the reaction mixture was stirred for 1.5 hours. The reaction product containing dodecylbenzenesulfonic acid and spent acid was then allowed to stand without stirring and separated into two layers. The upper layer contained the product, dodecylbenzenesulfonic acid, while the bottom layer contained spent acid which was separated from the upper layer and discarded. The product was a viscous brown liquid having a Gardner color of greater than 15 and an AV (acid value) of approximately 300.

(b) Preparation of naphthalenesulfonic acid

A total of 6.09 g of naphthalene was charged to a flask and melted by heating to 100° C. Then 5.25 g of 98% sulfuric acid was added to the molten naphthalene over 0.5 hours and the resulting reaction mixture heated at 150°–160° C. for three hours. The reaction product, a mixture of naphthalenesulfonic acid and sulfuric acid was cooled to 90° C. Then 10.52 g of water was added with cooling and stirring and the product cooled to 30° C.

(c) Condensation of dodecylbenzenesulfonic acid and naphthalenesulfonic acid with formaldehyde The linear dodecylbenzenesulfonic acid prepared in (a) above was added to the mixture of naphthalenesulfonic acid and sulfuric acid prepared in (b) above using fast agitation and cooling at 30°–40° C. Then 4.66 g of 37% formaldehyde solution was added at 40°–50° C. to the mixture of sulfonic acids. The reaction mixture was slowly heated to 100° C. and refluxed at 100° C. for sixteen to eighteen hours. Reflux was then continued until all of the formaldehyde had reacted. The condensation product was then cooled to 95° C., diluted with 19.53 g of water and the diluted product cooled to 30° C. An additional 25.30 g of water was then added to the diluted product and 11.70 g of sodium hydroxide solution (45%) was added with fast agitation to neutralize.

The neutralized solution of the co-condensate (condensation product) of dodecylbenzenesulfonate and naphthalenesulfonic acid with formaldehyde was a brown, clear liquid having a Gardner color greater than 15, a density of 8.2 lbs per gallon, a pH of 8.5±0.5, containing 32% solids and having a Saybolt viscosity at 100° F. of 42 seconds. On dilution to 26% solids, the brown, clear liquid has a Saybolt viscosity at 100° F. of 35 seconds.

EXAMPLE II

This example describes biodegradability of a condensation product of a linear dodecylbenzenesulfonic acid and naphthalenesulfonic acid with formaldehyde prepared by the procedure given in Example I.

The procedure which was followed is found in ASTM D2667-70 (Reapproved 1975) "Standard Test Method for Biodegradability of Alkylbenzene Sulfonates." In brief, microorganisms were inoculated in a flask that contained a chemically defined microbial growth medium and the surfactant to be tested. Aeration was accomplished by continuous shaking of the flask. Following two adaptive transfers, biodegradation was determined by measuring reduction in surfactant content over an eight day period by means of the Methylene Blue Colorimetric Procedure (ASTM D2330-68, Reapproved 1974).

The microbial culture was a sample of domestic activated sludge from the Florham Park (N.J.) Sewer Treatment Plant. It was maintained as a culture for two weeks before use by two weekly transfers in basal medium plus reference surfactant.

The reference surfactant was a Linear Alkyl Sulfonate (LAS) solution obtained from the U.S. Environmental Protection Agency, Environmental Monitoring and Support Laboratory in Cincinnati, Ohio having the following properties:
Lot No.: C7181
Date: 775
Average Molecular Weight: 318
Active LAS: 5.55%
Shake Flask Test: 90+%
Activated Sludge Test: 95+%

As required by ASTM D2667, samples were taken during the eight day test at zero time (immediately after inoculation and mixing of the flask contents) and on the seventh and eighth days. Biodegradability of the reference surfactant was followed as a control. Two replicates were analyzed at zero time and seven days; one replicate was analyzed at eight days.

|  | % Degraded | |
| --- | --- | --- |
|  | Reference | Sample |
| 7 days | 93.5 | 95.8 |
|  | 96.9 | 96.1 |
|  | 95.1 average | 96.0 average |
| 8 days | 96.4 | 96.3 |
| Average of 7 and 8 days | 95.8* | 96.2 |

*The ASTM standard requires that biodegradability of the reference sample be greater than 97.5%. This requirement was waived in this test, because the EPA reference surfactant was rated only as being greater than 90% biodegradable by the shake flask method.

An alkylbenzene sulfonate was considered biodegradable by the shake flask presumptive test as described in ASTM D2667 if the surfactant reduction equals or exceeds 90%. Therefore, the sample from Example I of the condensation product of linear dodecylbenzenesulfonic acid and naphthalenesulfonic acid with formaldehyde was biodegradable since the average of the 7 and 8 day reduction in concentration is 96.2%.

EXAMPLE III

The biodegradable procedure in Example II was repeated with the following two samples.

Sample No. 1 was the condensation product of 1 mole of dodecylbenzenesulfonic acid reacted with 1 mole of naphthalenesulfonic acid and 1.2 moles of formaldehyde and neutralized with ammonia.

Sample No. 2 was the same condensation product as in Sample No. 1 except the polymer was neutralized with diethanolamine (DEA).

|  | Sample No. 1 44% Solids | Sample No. 2 DEA 35% Solids | Lab Reference Standard Lot 17181 Shake Flask 90+% |
| --- | --- | --- | --- |
| Detergent concentration, ppm |  |  |  |
| Start test: | 24.5 ppm | 24.7 ppm | 30.5 ppm |
| End test: | 1.10 ppm | 1.20 ppm | 0.75 ppm |
| Percent reduction: | 95.5% | 95.1% | 97.5% |

The Lab Reference Surfactant Standard (control), dodecene-1 derived linear alkyl sulfonate, had a initial concentration of 30.5 ppm and a final concentration of 0.75 ppm representing a surfactant reduction of 97.5%. Since this reduction is equal to 97.5%, the test results were considered to be valid. Samples No. 1 and No. 2 were biodegradable because the surfactant reduction equaled or exceeded 90%.

EXAMPLE IV

This example demonstrates use of the condensation products as secondary emulsifiers in rubber latexes.

The samples of the following condensation products were evaluated as secondary emulsifiers in rubber latexes. Sample No. 3 was a commercial naphthaleneformaldehyde sulfonate condensate known as Lomar® PW. Sample No. 4 was a condensation product of 1 mole of dodecylbenzenesulfonic acid (DBSA) and 1 mole of naphthalenesulfonic acid (NSA) reacted with 1.2 moles of formaldehyde and neutralized with sodium hydroxide. Sample No. 5 was a condensation product of 3 moles of naphthalenesulfonic acid and 1 mole of dodecylbenzenesulfonic acid reacted with 2.4 moles of formaldehyde and neutralized with sodium hydroxide. Sample No. 6 was a condensation product of 2 moles of dodecylbenzenesulfonic acid and 1 mole of naphthalenesulfonic acid reacted with 1.8 moles of formaldehyde and neutralized with sodium hydroxide. Sample No. 7 was a condensation product of 2 moles of naphthalenesulfonic acid and 1 mole of dodecylbenzenesulfonic acid reacted with 1.8 moles of formaldehyde and neutralized with sodium hydroxide. Samples No. 4, 5, 6 and 7 were prepared by the procedure given in Example I using the molar quantities of reactants given above and the reaction conditions given in Example I. Samples No. 3-7 were evaluated in bottle polymerizations. The recipe used was a mixed fatty acid/rosin acid type similar to that used for SBR production. Isoprene was used as the monomer and Vazo 64® (2,2'-azobis-[isobutyronitrile]) as the catalyst. The polyisoprene recipe shown above was used. Bottle polymerizations were carried out by charging the quantities of ingredients shown in the above recipe into quart pop bottles with subsequent tumbling in a water bath for 8 hours at 60° C. The resulting latexes were compared based on degree of conversion of monomer to polymer (Conv.), precoagulum formation (Coag.) during reaction, viscosity (Visc.), surface tension of resulting latex and mechanical stability as indicated by high shear agitation using a Hamilton Beach homogenizer. Results of these tests are shown in Table I.

Sample No. 4 was very similar in performance to Sample No. 3, the commercial product. Hamilton Beach stabilities were comparable. Sample Nos. 4–7 had precipitation characteristics similar to the sodium salt of dodecylbenzenesulfonic acid, i.e., soluble in acid medium and in magnesium sulfate solutions but precipitated in the presence of calcium solutions. Sample No. 3, the commercial product, was stable in all of the above systems. This means that, unlike Sample No. 3, which always evolves through the coagulation procedure and into the effluent, Samples No. 4–7 would co-precipitate with the polymer if a coagulation system containing a soluble calcium salt, i.e., nitrate, chloride, etc. was used and the insoluble calcium salt of the condensation product would not evolve with the process effluent. Thus, Samples No. 4–7 would provide polymer producers with more flexibility than currently exists when Sample No. 3 is used.

EXAMPLE V

This example demonstrates use of a condensation product as a secondary emulsifier in bottle polymerization of rubber latex.

Sample No. 4, which was a condensation product of 1 mole of naphthalenesulfonic acid and 1 mole of dodecylbenzenesulfonic acid reacted with 1.2 moles of formaldehyde and neutralized with sodium hydroxide described in Example IV having 32% solids, was evaluated as a secondary emulsifier in polyisoprene polymerization. Sample No. 3, a commercial naphthaleneformaldehyde sulfonate condensate, also described in Example IV, was used as the control. Both samples were compared with a latex prepared without a secondary emulsifier to show the advantages of using Sample No. 4 as a secondary emulsifier in emulsion polymerization. The recipe and bottle variations were as follows:

| Bottle Identification | A | B | C |
|---|---|---|---|
| water (total) | 200 phm | 200 | 200 |
| isoprene | 100 | 100 | 100 |
| sodium stearate | 2.5 | 2.5 | 2.5 |
| potassium rosinate | 2.5 | 2.5 | 2.5 |
| trisodium phosphate | 0.3 | 0.3 | 0.3 |
| Sample No. 3 | | 1.0 | |
| Sample No. 4 (dry basis) | | | 1.0 |
| Vazo 64 ® (2,2-azobis [isobutyronitrile]) | 0.5 | 0.5 | 0.5 |

Bottle polymerizations were carried out in quart pop bottles rotating in a water bath for 16 hours at 60° C. at which time the bottles were removed from the bath. The bottles were then allowed to cool to room temperature and the properties of the latexes given below were determined:

| Bottle Identification | A | B | C |
|---|---|---|---|
| % conversion | 95 | 99+ | 99+ |
| surface tension (dynes/cm) | 61 | 60 | 60 |
| viscosity (cp) | 18 | 28 | 28 |
| coagulum (gms/100) | 4.8 | 0.1 | 0.1 |

The three polyisoprene latexes were coagulated and the resulting crumb rubbers examined. No apparent differences were noted in any of the three coagulated rubbers. These observations showed Sample No. 4 was equivalent and indistinguishable from Sample No. 3 as a secondary emulsifier in emulsion polymerization.

EXAMPLE IV

This example demonstrates use of a condensation product as a secondary emulsifier in latex. Sample No. 4 was the condensation product described in Example IV and Sample No. 3 was the commercial naphthaleneformaldehyde sulfonate also described in Example IV. Bottle polymerizations were carried out in quart pop bottles rotating in a water bath at 60° C. Recipes tested were as follows:

| | 1 | 2 | 3 | 4 |
|---|---|---|---|---|
| water (total) | 200 phm | 200 | 200 | 200 |
| sodium stearate | 2.5 | 2.5 | 2.5 | 2.5 |
| potassium rosinate | 2.5 | 2.5 | 2.5 | 2.5 |
| Sample No. 4 (dry basis) | 0.5 | | 0.5 | |
| Sample No. 3 | | 0.5 | | 0.5 |
| isoprene | 75 | 75 | 67 | 67 |
| styrene | 25 | 25 | | |
| acrylonitrile | | | 33 | 33 |
| 2,2'-azobis (isobutyronitrile) | 0.5 | 0.5 | 0.5 | 0.5 |
| trisodium phosphate | 0.3 | 0.3 | 0.3 | 0.3 |

After tumbling for 16 hours in the water bath, the bottles were removed, allowed to cool to room temperature, then sampled. All reactions achieved essentially 100% conversion during the time allotted. Based on conversion, viscosity, physical appearance, i.e., precoagulum formation and mechanical stability, bottles 1 and 2 were indistinguishable as were 3 and 4 showing that Sample No. 4 is a suitable replacement for Sample No. 3 as a secondary emulsifier in rubber latex.

EXAMPLE VII

This example demonstrates use of the condensation product as a co-emulsifier in latex polymerization. Recipes containing the following ingredients were used:

| Bottle Identification | A | B | C | D | E |
|---|---|---|---|---|---|
| water (total) phm | 200 | 200 | 200 | 200 | 200 |
| trisodium phosphate | 0.3 | 0.3 | 0.3 | 0.3 | 0.3 |
| nonionic emulsifier | | | 4.0 | | |
| anionic emulsifier | 1.0 | 1.0 | 1.0 | | |
| isoprene | 100 | 100 | 100 | 100 | 100 |
| Vazo 64 ® | 0.5 | 0.5 | 0.5 | 0.5 | 0.5 |
| Sample No. 4 (dry basis) | | 4.0 | | 5.0 | |
| Sample No. 3 | | | | 0.5 | 5.0 |

Sample No. 4 was the condensation product described in Example IV and Sample No. 3 was the commercial naphthalene-formaldehyde sulfonate also described in Example IV. Sample No. 4 was used as a primary emulsifier and co-emulsifier and Sample No. 3 as an emulsifier and secondary emulsifier in the above recipes. The nonionic emulsifier was a commercial condensation product of 1 mole of octylphenol and 10 moles of ethylene oxide. The anionic emulsifier was a commercial sodium salt of linear dodecylbenzene sulfonate known as Calsoft ® F-90. Polymerizations were carried out for 16 hours at 60° F. at which time the bottles were removed from the water bath and cooled. The results were as follows:

| Bottle Identification | A | B | C | D | E |
|---|---|---|---|---|---|
| % conversion | 83.3 | 85.8 | 86.7 | 82.7 | NR |
| surface tension (dynes/cm) | | 60 | 62 | | |
| viscosity (cp) | | 475 | 215 | | |

These results indicated that Sample No. 4 was comparable to the nonionic surfactant as a co-emulsifier for emulsion polymerization. Sample No. 3 in Bottle (E) as expected did not form micelles and no reaction occurred. Sample No. 4 had primary emulsion tendencies as demonstrated by Bottle (D) but was a poor emulsifier as ca 10% coagulum resulted. Bottles (C) and (B) had ca 1% coagulum, Bottle (A) with no co-emulsifier had ca 5%.

TABLE I

PHYSICAL PROPERTIES OF THE LATEXES PREPARED WITH SAMPLE NOS. 3 THROUGH 7 AS SECONDARY EMULSIFIERS

| Sample No. | Conc. of Sample (phm) | Conv. (%) | Coag. (gms/100) | Visc. (cp) | Mole Ratio NSA | DBSA |
|---|---|---|---|---|---|---|
| 3 | 0.1 | 100 | 0.24 | 43 | | |
|   | 0.5 | 100 | 0.24 | 66 | | |
| 4 | 0.1 | 100 | 0.34 | 43 | 1 | 1 |
|   | 0.5 | 100 | 0.26 | 32 | 1 | 1 |
| 5 | 0.1 | 89.8 | 0.38 | 23 | 3 | 1 |
|   | 0.5 | 94.7 | 0.46 | 24 | 3 | 1 |
| 6 | 0.1 | 90.9 | 0.45 | 17 | 1 | 2 |
|   | 0.5 | 98.7 | 0.39 | 18 | 1 | 2 |
| 7 | 0.1 | 91.8 | 0.50 | 19 | 2 | 1 |
|   | 0.5 | 98.5 | 0.44 | 22 | 2 | 1 |

DBSA (dodecylbenzenesulfonic acid)
NSA (naphthalenesulfonic acid)

While the invention has been described with reference to certain specific embodiments thereof, it is understood that it is not to be so limited since alterations and changes may be made therein which are within the full and intended scope of the appended claims.

What is claimed is:

1. A condensation product of 1 mole of naphthalenesulfonic acid, from about 0.1 to about 5 moles of linear alkylbenzenesulfonic acid having an alkyl moiety of from about 4 to about 20 carbon atoms, and from about 0.26 to about 3.1 moles of formaldehyde, produced by heating at about 70° C. to about 150° C. until the formaldehyde has reacted, and salts thereof.

2. The condensation product of claim 1 where the alkylbenzenesulfonic acid is linear dodecylbenzenesulfonic acid.

3. The condensation product of claim 1 where 1 mole of naphthalenesulfonic acid, about 1 mole of linear alkylbenzenesulfonic acid having an alkyl moiety of from about 4 to about 20 carbon atoms, and about 1.2 moles of formaldehyde are condensed.

4. The salt of the condensation product of claim 1 where the salt is selected from the group consisting of lithium, potassium, sodium, ammonium, amine, zinc, aluminum and magnesium salts.

5. The salt of the condensation product of claim 4 where the salt is the sodium salt.

6. The process for preparation of the condensation product of claim 1 comprising preparing the condensation product by reacting together at about 70° C. to about 150° C.
   (a) 1 mole of naphthalenesulfonic acid,
   (b) from about 0.1 to about 5 moles of linear alkylbenzenesulfonic acid having an alkyl moiety of from about 4 to about 20 carbon atoms, and
   (c) from about 0.26 to about 3.1 moles of formaldehyde.

7. The process of claim 6 where 1 mole of naphthalenesulfonic acid, about 1 mole of linear dodecylbenzenesulfonic acid and about 1.2 moles of formaldehyde are reacted.

8. The process of claim 6 where condensation product is reacted with a salt forming cation to obtain a salt.

9. The process of claim 8 where the salt forming cation is selected from the group consisting of lithium, potassium, sodium, ammonium, amine, zinc, aluminum and magnesium salts.

* * * * *